May 17, 1927.
C. C. LOVEJOY
1,629,400
AUTOMOBILE SEMAPHORE SIGNAL
Filed Sept. 2, 1926
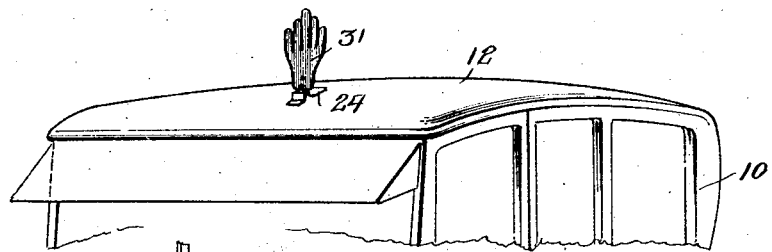
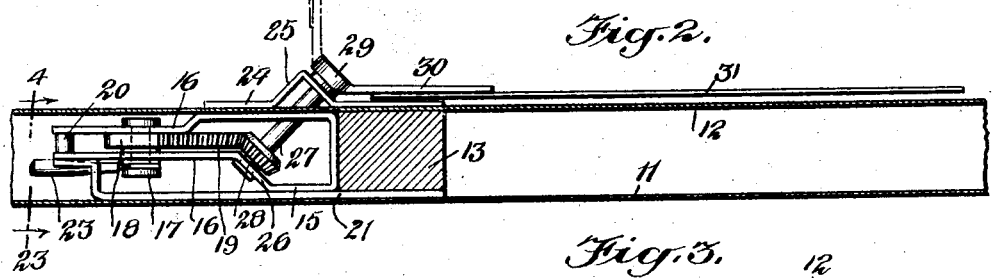
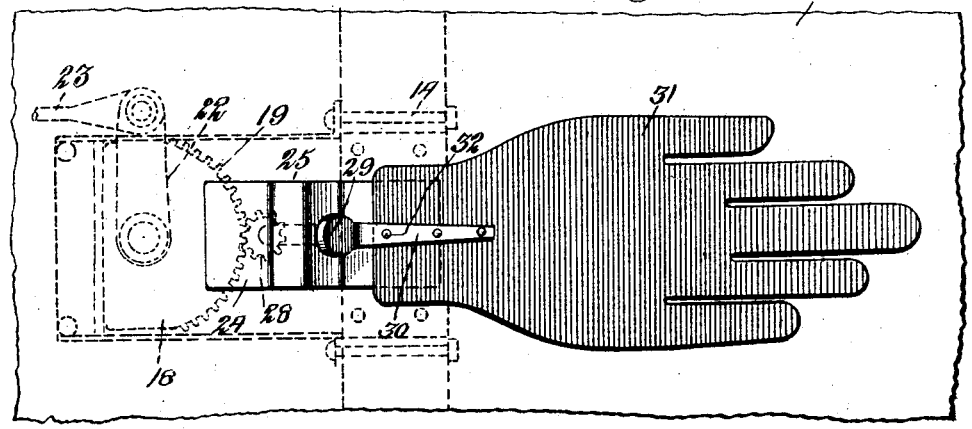
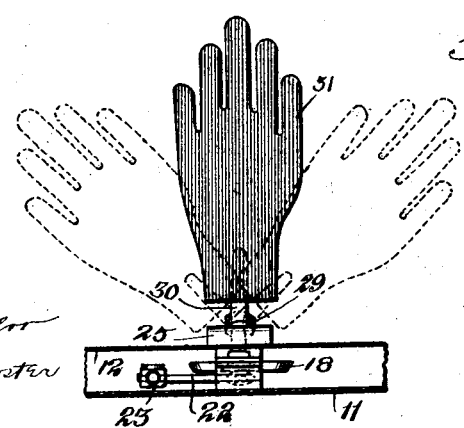
WITNESSES
INVENTOR
Clinton C. Lovejoy
BY
ATTORNEYS Patented May 17, 1927.

1,629,400

UNITED STATES PATENT OFFICE.

CLINTON C. LOVEJOY, OF LONG ISLAND CITY, NEW YORK.

AUTOMOBILE SEMAPHORE SIGNAL.

Application filed September 2, 1926. Serial No. 133,240.

The present invention is concerned with the provision of an automobile signal preferably mounted upon the top of the car and adapted to be used as a semaphore for indicating "stop", or right and left turns.

An object of the invention is to provide a signal of this character so constructed that it will normally be concealed from the view of the drivers of approaching or following cars, which signal may be expeditiously and easily manipulated to give warning to other drivers of the proposed maneuvers of the car carrying the signal.

A further object of the invention is to provide a semaphore signal of simple practical construction which will be rugged, durable and efficient, which will not detract from the appearance of the automobile and which is well suited to the requirements of economical manufacture and installment.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein Figure 1 is a perspective view showing the upper portion of an automobile with my improved signal in applied position;

Fig. 2 is a longitudinal sectional detail through the top of the car;

Fig. 3 is a top plan view of Fig. 2, and

Fig. 4 is a transverse sectional view approximately on the line 4—4 of Fig. 2, indicating in dotted lines the position of the signal when right and left turns are to be made.

In the drawings I have used the reference character 10 to designate an automobile of conventional construction, the double wall or top of which includes a ceiling 11 and a roof 12, secured to the upper and lower faces, respectively, of a pair of transverse ribs or frame bars 13. The operating mechanism for the signal is adapted to be housed in the space between the ceiling and roof and to be secured to one of the ribs, although it will be apparent that the exact location of the signal may be considerably varied in accordance with the particular roof structure of the car to which the signal is applied.

Bolted as at 14 or otherwise secured to the rib 13, is a bracket 15 concealed between the ceiling and roof. This bracket includes a pair of spaced forwardly extending arms 16 which provide mounting for a short vertically disposed shaft 17 to which is rigidly fixed a sector plate 18 formed with beveled teeth 19. Rigidity may be added to the structure by the use of a stud or rivet 20 connecting the free ends of the arms 16 and by an L-shaped bracing member 21 secured to the rib 13 and supporting the arms 16 at their free ends. Fixed to the shaft 17 and projecting laterally therefrom is a crank arm 22 pivotally connected at its free end to the rear end of an operating link 23. This link may be actuated through the intermediacy of any conventional or convenient mechanism (not shown). Preferably some means is provided adjacent the wheel, of the car or convenient to the driver's seat, for manually actuating the link 23 to rotate the sector plate 18.

Secured upon the top of the car is a metallic strip 24 having an upwardly offset inverted V portion 25. One leg of the V co-operates with an inclined section 26 of the bracket 15 to support a rock shaft 27, said shaft extending through the roof of the car and being disposed at an angle of approximately 45° to the roof. The lower end of the shaft 27 carries a beveled pinion 28 meshing with the teeth 19 of the sector plate. The upper end of the shaft 27 carries a hub or disk 29 to which is integrally or rigidly secured a finger 30 adapted to supply the semaphore signal 31.

The signal 31 may be of any desired conformation but is preferably made in the shape of a hand and is riveted or otherwise secured as at 32 to the finger 30.

It will be noted with particular reference to Fig. 2, that the finger 30, when the signal is in its normal inoperative position, lies parallel with the roof of the car so that the signal 31 is disposed flatly against the roof and cannot be seen by the driver of a following car. In order that the semaphore may lie in this normal inoperative position, the finger 30 is disposed at an angle of approximately 135° to the plane of the disk 29. Thus when rotating the disk through an angle of 180°, the semaphore 31 will swing into the vertical position indicated in dotted lines in Fig. 2 and in full lines in Fig. 4. When the signal is in a vertical position it will indicate the intention of the driver to stop the car. In the intermediate positions shown in dotted lines in Fig. 4, for causing right and left turns, the signals may be had by rotating the beveled gear 28 through 90° instead of 180°, it being understood that the position of the semaphore at this time will be somewhat rearwardly inclined.

From the foregoing description, it will be seen that I have provided a signal well suited to fulfill the above-recited objects of the invention.

Obviously various changes and alterations might be made in the general form and arrangement of the parts described without departing from the invention. Hence I do not wish to limit myself to the details set forth, but shall consider myself at liberty to make such changes and alterations as fairly fall within the spirit and scope of the appended claims.

What is claimed is:

1. A semaphore signal for automobiles, including a signaling arm adapted to normally lie flat against the top of the automobile, and means for moving said arm to signaling position, said means including a rotatable element to which the arm is connected, the arm being disposed at approximately an angle of 135° to the plane of the rotatable element, and the rotating element rotating in a plane of approximately 45° to the roof of the car whereby rotation of the element through 180° swings the signaling arm from its normal inoperative position to vertical position.

2. Signal operating mechanism for operating semaphore signal on the roof of an automobile, including a rockably mounted sector plate adapted for disposition between the ceiling and the roof of an automobile, a shaft carrying the semaphore and disposed at approximately a 45° angle to the roof, and a gear on the shaft meshing with the sector plate.

3. The combination with an automobile top including a roof, a ceiling, and transverse frame bars; of a bracket attached to one of the frame bars between the ceiling and roof, a sector plate rocking in the bracket, a shaft borne by the bracket and projecting above the roof at about a 45° angle thereto, a gear on the shaft meshing with the sector plate, and a semaphore arm carried by the exposed upper end of the shaft and adapted to normally lie flush against the top of the automobile.

4. The combination with an automobile top including a roof, a ceiling, and transverse frame bars; of a bracket attached to one of the frame bars between the ceiling and roof, a sector plate rocking in the bracket, a shaft borne by the bracket and projecting above the roof at about a 45° angle thereto, a gear on the shaft meshing with the sector plate, and a semaphore arm carried by the exposed upper end of the shaft and adapted to normally lie flat against the top of the automobile, said arm being disposed at an angle of approximately 135° to the plane of the transverse axis of the shaft, whereby a half rotation of the shaft will swing the arm from horizontal to vertical position.

CLINTON C. LOVEJOY.